E. P. OSWALD.
GENERATING PLANT.
APPLICATION FILED OCT. 24, 1918.

1,415,385. Patented May 9, 1922.

Inventor
EARL P. OSWALD.
By Raymond A. Parker
Attorney

UNITED STATES PATENT OFFICE.

EARL P. OSWALD, OF DETROIT, MICHIGAN.

GENERATING PLANT.

1,415,385.  Specification of Letters Patent.  Patented May 9, 1922.

Application filed October 24, 1918. Serial No. 259,463.

*To all whom it may concern:*

Be it known that I, EARL P. OSWALD, a citizen of the United States, residing at Detroit, county of Wayne, State of Michigan, have invented a certain new and useful Improvement in Generating Plants, and declare the following to be a full, clear, and exact description of the same, such as will enable others skilled in the art to which it pertains to make and use the same, reference being had to the accompanying drawings, which form a part of this specification.

My invention relates to generating plants for electricity and an object of my improvements is to automatically maintain the liquid of the storage battery in proper conditions.

I secure this object in the device illustrated in the accompanying drawings in which.

$a$ is the storage battery and $b$ is an internal combustion engine shown directly coupled to a dynamo $c$ which may serve both as a motor and generator as hereinafter described. $d$ is the ignition apparatus.

$a^3$ is a pole of the battery $a$, which I shall assume is the positive pole and $a^2$ is the negative pole. $a^4$ is a contact adapted to be put into electrical communication with the pole $a^3$ as hereinafter described.

$e$ is a conductor leading from the contact $a^4$ and communicating with the ignition apparatus $d$ and having a signal light interposed between its ends. The conductor $e$ is in electrical connection with the pole $a^2$ of the battery $a$. $d^2$ is a switch adapted to disconnect the ignition apparatus $d$ from the conductor $e$ or put it into connection therewith.

$m$ is a conductor joining the pole $a^3$ with the brush $c^2$ of the dynamo $c$.

$f$ is a conductor leading from the brush $c^3$ of the dynamo $c$ and extending in a coil $f^2$ around a magnetic core $h$ and having a make-and-break apparatus $f^3$ in circuit therewith, the conductor $f$ $f^2$ is in communication with the pole $a^2$ of the battery when the make-and-break apparatus $f^3$ is closed. $h^2$ is an armature by which the make-and-break apparatus $f^3$ may be operated. $f^4$ is a spring tending to draw the armature $h^2$ away from the pole of the magnet core $h$.

$j$ is a conductor branching from the conductor $f$ and extending to and joined with the pole $a^2$ of the battery $a$. $j^2$ is a switch in the conductor $j$.

$g$ is a conductor connected with the conductor $m$ passing in a fine coil around the magnet core $h$ and then connecting to the conductor $f$ where it joins the branch $j$.

$k$ $k$ is the working circuit of the battery $a$.

Figure 1:
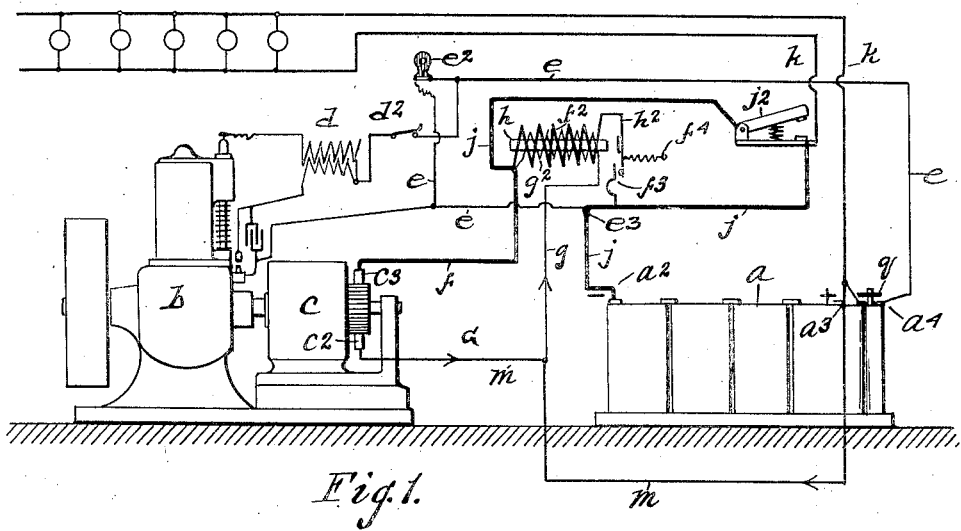
Figure 1 is an elevation of an apparatus embodying my invention with a diagrammatic representation of the circuits and some of the electrical apparatus.
Figures 2, 3, 4:
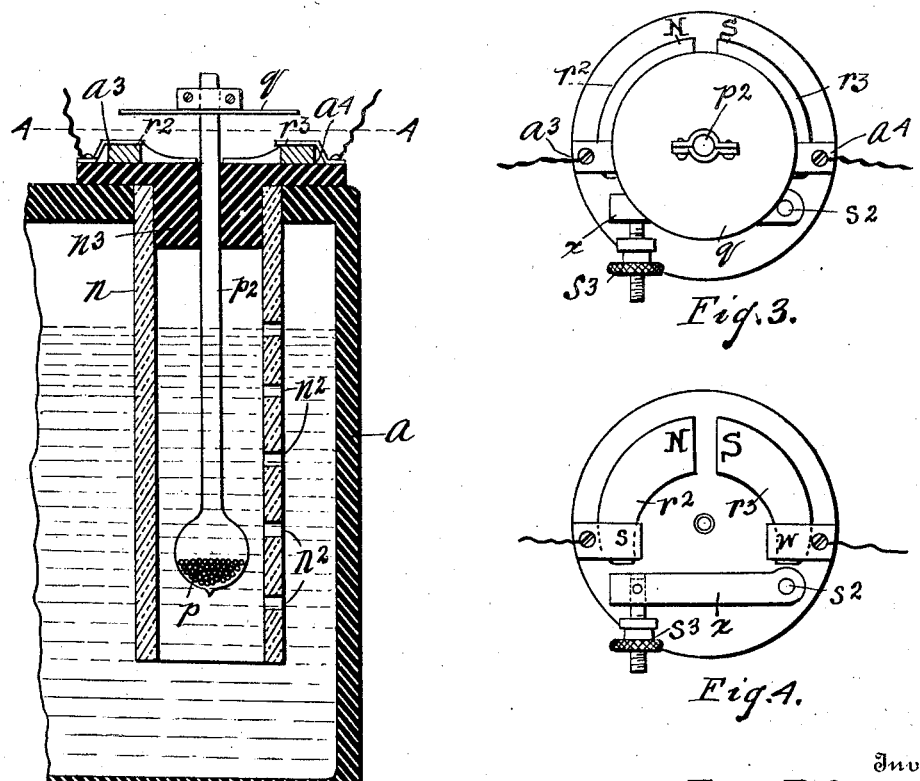
Figure 2 is a detail sectional elevation showing the automatic make-and-break apparatus.
Figure 3 is a detail plan view of the apparatus shown in Fig. 2.
Figure 4 is a similar view to Fig. 3 the armature disk being removed.

$n$ (Fig. 2) is a tube open at its lower end and extending through the cover of the battery $a$ and toward the bottom of the battery cell. $n^2$ are apertures formed at different levels through the wall of the tube $n$ and below the liquid in the battery cell. $n^3$ is a plug or cover fitting into the outer end of the tube $n$ and substantially closing the outer end. $r^2$ $r^3$ are permanent magnets upon the cover $n^3$, one having a north pole upon one side of the axis of the tube $n$ and the other having a south pole on the other side of said axis. The pole $a^3$ has contact strips of non-magnetic metal extending over the pole of the magnet $r^2$ and the terminal $a^4$ has a similar strip $w$ of non-magnetic metal extending over the pole of the magnet $r^3$.

$p$ is the bulb and $p^2$ the stem of a hydrometer tube located axially in the tube $n$. The tube $p^2$ extends and is adapted to reciprocate vertically through a central aperture in the cover $n^3$. $q$ is a disk of magnetic material adapted to be attracted by the poles of the magnets $r^2$ $r^3$ and to engage the contact strips $s$, $w$. of non-magnetic metal over said poles to form an electrical connection between the pole $a^3$ and the terminal $a^4$. The bulb $p$ contains the usual weight which is adjusted so that it shall rise and fall with the change in the specific gravity of the electrolyte or liquid in the cell.

$x$ (Fig. 4) is a lever arm of magnetic material pivoted at $s^2$ closely adjacent to the pole of the magnet $r^3$ and provided at the other end with an adjusting screw apparatus $s^3$ by which this end may be adjusted toward or away from the poles of the magnet $r^2$. By manipulating the screw $s^3$ the gap between the pole $r^2$ and the adjacent end of the lever arm may be adjusted and more or less of the magnetic flux between the poles of the magnet $r^2$ $r^3$ may be taken through the arm $x$ and consequently the effective strength of the adjacent poles of said magnets to act upon the disk $q$ may be regulated in this way.

The operation of the above described apparatus is as follows:

Suppose the switches $d^2$ and $j^2$ to be in position so that their respective circuits shall be open. If the specific gravity of the liquid of the cell $a$ falls below a certain point the hydrometer tube $p$ $p^2$ sinks in the liquid and the disk $q$ forms a bridge between the pole $a^3$ and the contact $a^4$, this completes the circuit through the signal light $e^2$ and gives notice that the battery requires recharging.

The operator then closes the switch $d^2$ throwing the ignition apparatus into operative condition and then closes the switch $j^2$, the current then runs from the pole $a^3$ of the battery through the conductor $m$ through the dynamo $c$, the conductors $f$ $j$ and returns to the battery at the pole $a^2$. This sets the dynamo $c$ in motion as a motor and starts the engine $b$ into operation.

A current is now established through the conductor $g$ and the small coil $g^2$ energizing the core $h$ which attracts the armature $h^2$ against the action of the spring $f^4$ and closes the circuit at $f^3$. As the engine increases in speed the voltage of the dynamo $c$ becomes greater than that of the battery $a$ and the current is sent in the reverse direction through the conductor $m$ to the pole $a^3$, through the battery through the conductor $j$, the conductors $f^2$ and $f$ and back to the dynamo, and this continues until the battery is again charged.

The current passing through the coil $f^2$ assists to hold the contact $f^3$ closed.

When the battery is charged the specific gravity of the liquid therein is increased and its buoyant action of the liquid upon the hydrometer $p$ $p^2$ overcomes the attraction of the magnets $r^2$ $r^3$ for the disk $q$ and raises said disk breaking the circuit $e$ which will throw the ignition apparatus of the engine out of circuit and the engine will stop.

As the rotation of the armature of the dynamo $c$ decreases, the energizing current through the coils around the magnet core $h$ will stop and the spring $f^4$ will cause the breaking of the circuit at $f^3$.

The point at which the hydrometer shall lift the disk $q$ against the attraction of the magnets $r^2$ $r^3$ is adjusted by adjusting the gap between the free end of the arm $x$ and the pole of the magnet $r^2$.

The connection between the armature $q$ and contacts $s$ and $w$ is positive and certain because of the attraction of the magnetic poles and when the connection is broken it is broken completely, inasmuch as the separating of the armature $q$ from the poles lessen the attractions and permits the effect of the liquid to raise the armature clear and positively to its upper position.

Of course any suitable float can be substituted for the hydrometer tube.

What I claim is:

1. In an apparatus of the kind described, a storage battery, a hydrometer tube in the liquid of said battery, an armature carried by said tube and adapted to make and break an electric circuit, a signal in said circuit and a magnet adapted to attract said armature and hold it yieldingly in position to complete said circuit, whereby the signal will be energized.

2. In an apparatus of the kind described, a storage battery, a hydrometer tube in the liquid of said battery, an armature carried by said tube and adapted to make and break an electric circuit, a signal in said circuit and a magnet adapted to attract said armature and hold it yieldingly in position to complete said circuit, whereby the signal will be energized, and means for adjusting the strength of said magnet.

3. In an apparatus of the kind described, a storage battery, a hydrometer tube in the liquid of said battery, an armature carried by said tube and adapted to make-and-break an electric circuit, a signal in said circuit, and a magnet adapted to attract said armature and hold it yieldingly in position to complete said circuit, whereby the signal will be energized and means for adjusting the magnetic flux through said armature.

4. In an apparatus of the character described, a storage battery, a generator for charging said battery, an internal combustion engine having an ignition system operatively connected with said generator, a signal, an electrical circuit adapted when closed to energize said signal and when opened to deenergize said ignition system, and means automatically actuated by a change in the specific gravity of the electrolyte in said battery to open or close said circuit.

5. In an apparatus of the character described, a storage battery, a generator for charging said battery, an internal combustion engine operatively connected with said generator, a signal, an electrical circuit adapted when closed to energize said signal and when opened to deenergize said ignition system, a hydrometer tube in the liquid of said battery, an armature carried by said tube and adapted to make or break said circuit, and a magnet adapted to attract said armature and hold it in position to complete said circuit.

6. In an apparatus of the character described, a storage battery, a generator for charging said battery, an internal combustion engine operatively connected with said generator, a signal, an electrical circuit adapted when closed to energize said signal and when opened to deenergize said ignition system, a hydrometer tube in the liquid of said battery, an armature carried by said tube and adapted to make or break said circuit, a magnet adapted to attract said armature and hold it in position to complete said circuit, and means for adjusting the magnetic flux through said armature.

In testimony whereof, I sign this specification.

EARL P. OSWALD.